United States Patent [19]
Green

[11] Patent Number: 5,391,027
[45] Date of Patent: Feb. 21, 1995

[54] MACHINE TOOL SYSTEM

[75] Inventor: Richard S. Green, Lapeer, Mich.

[73] Assignee: Valenite Inc., Madison Heights, Mich.

[21] Appl. No.: 218,407

[22] Filed: Mar. 28, 1994

[51] Int. Cl.$^6$ ............................ B23C 5/26; B23B 31/02
[52] U.S. Cl. ........................................ 409/233; 82/160; 279/2.11
[58] Field of Search ............... 409/231, 232, 233, 234; 408/238, 239 R, 239 A, 240; 279/2.11, 2.12; 82/158, 160

[56] References Cited

U.S. PATENT DOCUMENTS

| | | | |
|---|---|---|---|
| 4,406,195 | 9/1983 | Kruger et al. | 82/158 |
| 4,726,269 | 2/1988 | Erickson | 82/160 |
| 4,736,659 | 4/1988 | Erickson | 82/160 |
| 4,784,542 | 11/1988 | Tack et al. | 279/2.11 |
| 5,193,954 | 3/1993 | Hunt | 409/233 |

Primary Examiner—Daniel W. Howell
Attorney, Agent, or Firm—Bill C. Panagos

[57] ABSTRACT

A machine tool system includes a clamping unit installable on the head of a cutting machine, and a tool holder insertable into the clamping unit. The clamping unit includes an annular guide member and a sleeve telescoped onto the guide member. A flat drive key is positioned in an axial slot in the sleeve to establish a driving connection between the clamping unit and the tool holder. The tool holder is wedged into the clamping unit by means of radially-movable wedge lock elements and an axially movable drawbar.

5 Claims, 1 Drawing Sheet

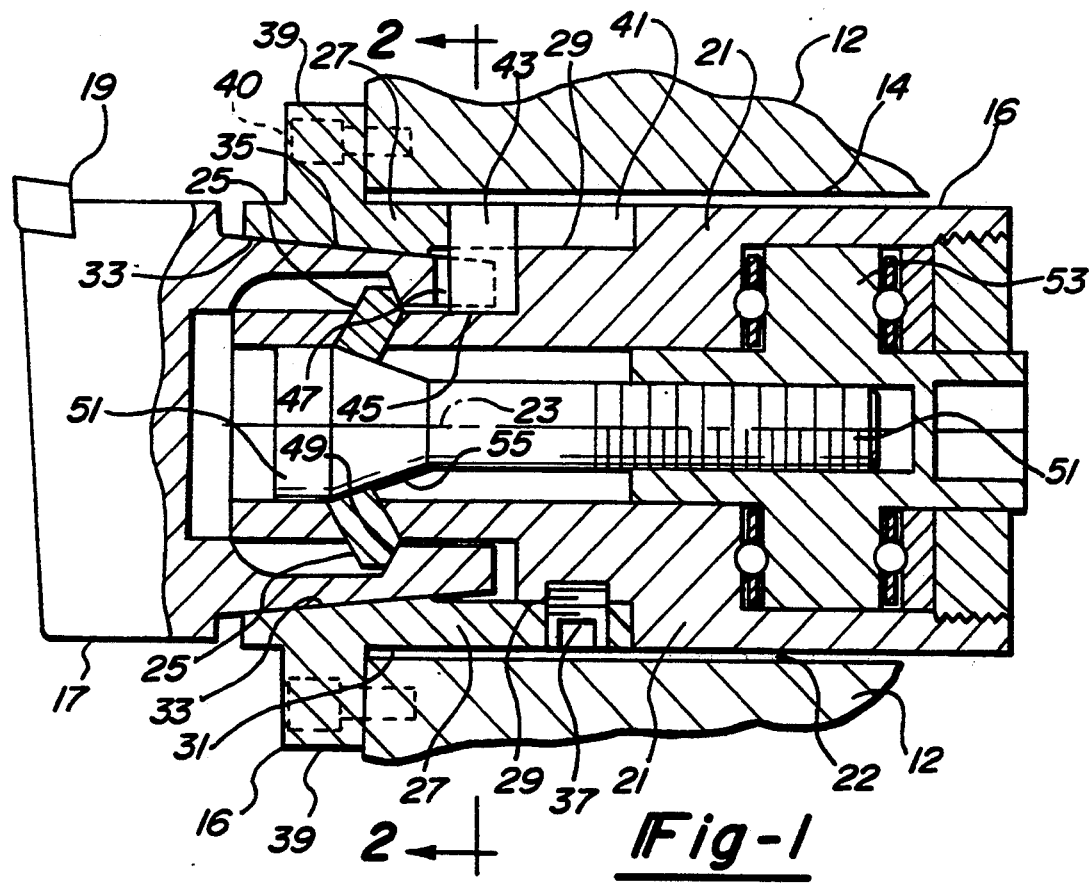
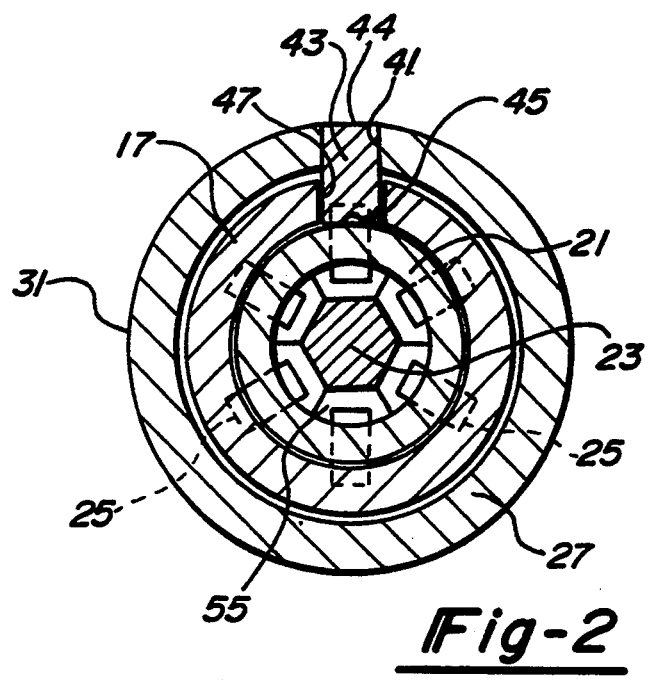

MACHINE TOOL SYSTEM

BACKGROUND OF THE INVENTION

1. Field of the Invention

This invention relates to a machine tool system, and more particularly to a mechanism for securely clamping a cutting tool holder in a cutting machine.

2. Prior Developments

U.S. Pat. No. 5,193,954, issued to Carl Hunt on Mar. 16, 1993, discloses a machine tool system that comprises a clamping device mounted in the head of a cutting machine. The machine head can be rotating or non-rotating.

The clamping device has a socket adapted to receive therein a cutting tool holder, whereby various different cutting tools can be selectively mounted on the cutting machine head.

The cutting tool holder comprises a tubular section having a frusto-conical outer surface adapted to seat against a conical socket surface. The inner surface of the tubular section forms an annular lip that is engageable with individual wedge lock elements that are radially movable to exert axial lock forces on the tubular section of the cutting tool holder. An axially movable drawbar is provided to move the wedge lock elements into or out of engagement with the annular lip on the tool holder.

The tool holder has a wedge lock fit in the frusto-conical socket of the clamping device, whereby the tool holder has a secure non-wobbling securement in the clamping device. However, it is also necessary to provide a clutch means between the clamping device and tool holder in order to prevent circumferential slippage between the tool holder and clamping device. In the machine tool system shown in U.S. Pat. No. 5,193,954, the clutch means comprises an annular toothed member bolted onto an internal end surface of the clamping device. The tubular section of the tool holder has multiple grooves in its end surface that fit onto the teeth of the annular toothed member, to establish a non-slip drive connection between the clamping unit and tool holder.

SUMMARY OF THE INVENTION

The present invention relates to a machine tool system of the type disclosed in U.S. Pat. No. 5,193,954, wherein an improved low cost clutch means is provided between the clamping unit and the tool holder.

In one particular embodiment of the invention, the clamping unit comprises an annular guide member having radial guide slots for the individual wedge lock elements, and a sleeve having a telescopic fit on the annular guide member. The sleeve has a single axial key slot that serves to mount a drive key.

The tool holder comprises a tubular section that has an axial groove in its end surface adapted to fit onto the drive key in the clamping unit. The drive key constitutes a relatively low cost clutch for preventing circumferential slippage between the clamping unit and tool holder.

The principal aim of the invention is to provide a machine tool system having a relatively low cost driving connection between a clamping unit and an associated cutting tool holder.

THE DRAWINGS

FIG. 1 is a longitudinal sectional view taken through a machine tool system constructed according to the invention.

FIG. 2 is a sectional view taken on line 2—2 in. FIG. 1:

DESCRIPTION OF A PREFERRED EMBODIMENT OF THE INVENTION

The drawing fragmentarily shows a head 12 of a conventional cutting machine. The head can be a driven rotary head or a non-rotating head, depending on the machine structure and the nature of the work to be machined. Head 12 has a cylindrical bore 14 adapted to receive therein a clamping unit 16 for a cutting tool holder 17. The cutting implement (or tool) is designated by numeral 19.

Different types of cutting tools can be accommodated in the machine, e.g., a drill, tap, reamer, end mill, or turning tool. The tool holder 17 is removably gripped or clamped by clamping unit 16, whereby a given tool holder can be replaced with another tool holder having a different cutting tool or a newly sharpened cutting tool. The cutting machine can include a numerically controlled tool changer device for transferring tool holder 17 between a stored (inactive) position in a storage mechanism and an operating position inserted into clamping unit 16.

Clamping unit 16 comprises an annular guide member 21 having an external cylindrical side surface 22 and a central longitudinal axis 23. Near its leading (left) end, annular guide member 21 has six radially oriented guide slots 24. A wedge lock element 25 is slidably mounted in each guide slot.

Clamping unit 16 further comprises a sleeve 27 that has a telescopic press fit on annular guide member 21. The guide member has an annular recess in its side surface 22 that forms an inset surface 29. Sleeve 27 is press fit on inset surface 29 so that the external surface 31 of the sleeve is an axial continuation of surface 22. Guide member 21 and sleeve 27 are rigidly joined together by their press fit connection. A set screw 37 is extended through the sleeve into inset surface 29, as an additional connection means. A radial mounting flange 39 extends from sleeve 27 for detachably mounting the clamping unit on the cutting machine head; a series of bolts 40 attaches the mounting flange to machine head 12.

A single axial key slot 41 is provided in the right end of sleeve 27 for mounting a flat-sided drive key 43. The drive key has an outer edge 44 aligned with the external surface of sleeve 27, and an inner edge 45 abutting guide member 21.

Sleeve 27 has an internal frusto-conical socket surface 33 adapted to mate with a frusto-conical surface 35 on tool holder 17. The slope angles of the two frusto-conical surfaces 33 and 35 are the same, such that these surfaces are in contact along the entire length of surface engagement when the tool holder is inserted into the clamping unit.

Tool holder 17 is internally recessed so that the holder has a tubular section insertable into the clamping unit. A single axial groove 47 is provided in the tubular section of the tool holder for fitting onto the drive key 43, whereby a driving connection is established between the clamping unit 16 and the tool holder 17.

The inner surface of the tool holder tubular section forms an annular lip that has a conical surface 49 engageable with the wedge lock elements 25, whereby the tool holder is firmly wedged against the frusto-conical surface 33 on sleeve 27.

The wedge lock elements 25 are driven outwardly into engagement with lip surface 49 by means of a drawbar 51 and rotary actuator 53. The drawbar, actuator, and wedge lock elements can be constructed as shown in aforementioned U.S. Pat. No. 5,193,954. Rotary movement of the actuator in one direction advances the drawbar 51 rightwardly; such that the flat cam surfaces 55 on the drawbar move wedge lock elements 25 outwardly in guide slots 24, thereby wedging the tubular section of tool holder 17 tightly against conical surface 33 of the clamping unit. Reverse rotational motion of actuator 53 moves drawbar 51 leftwardly, so as to enable the tool holder to be unclamped from the clamping unit. The wedge lock elements may be equipped with a resilient returning means, as shown in FIG. 4 of U.S. Pat. No. 5,193,954.

The herein illustrated machine tool system is generally similar to the systems shown in U.S. Pat. No. 5,193,954. A feature of the present invention is the use of a single drive key 43 positioned in key slot 41 of sleeve 27 for establishing a driving connection between the clamping unit and tool holder 17. Drive key 43 constitutes a manufacturing cost improvement over the annular multi-toothed drive member used in the system illustrated in U.S. Pat. No. 5,193,954.

The drawings show a specific form of the invention. However, it will be appreciated that the invention can be practiced in other forms.

What is claimed is:

1. A machine tool system comprising an annular clamping unit having an axis; a cutting tool holder insertable into said clamping unit; and a drawbar movable on said axis for operating said clamping unit; said clamping unit comprising an annular guide member having a multiple number of guide slots extending radially away from the clamping unit axis, individual wedge lock elements slidably mounted in said guide slots, and a sleeve having a telescopic fit on said annular guide member; said sleeve having an internal frusto-conical socket surface and a single axial key slot spaced from said socket surface; a flat drive key seated in said key slot, said key having an inner edge abutting said annular guide member to limit radial insertional movement of said key; said tool holder comprising a tubular section having an outer frusto-conical surface adapted to mate with said frusto-conical socket surface, and an inner annular lip surface adapted to mate with said wedge lock elements; said tubular section having an axial groove adapted to fit onto said flat key when the tool holder is inserted into the clamping unit whereby the tool holder has a predetermined position of adjustment in the circumferential direction; said drawbar having cam surfaces engageable with the wedge lock elements for moving said elements into said annular lip surface.

2. The machine tool system of claim 1, wherein said annular guide member has an external side surface, and an annular recess in said side surface defining an annular inset surface; said sleeve having a telescopic fit on said inset surface; said sleeve having an external side surface that is an axial continuation of the external side surface on said annular guide member.

3. The machine tool system of claim 2, and further comprising a set screw extending through said sleeve into the inset surface on said annular guide member.

4. The machine tool system of claim 2, wherein said flat key has an outer edge that forms an annular continuation of the external side surface of the annular guide member.

5. The machine tool system of the claim 1, and further comprising a mounting flange extending radially outwardly from said sleeve.

* * * * *